United States Patent [19]

Takahashi

[11] Patent Number: 5,285,523
[45] Date of Patent: Feb. 8, 1994

[54] APPARATUS FOR RECOGNIZING DRIVING ENVIRONMENT OF VEHICLE

[75] Inventor: Hiroshi Takahashi, Zushi, Japan

[73] Assignee: Nissan Motor Co., Ltd., Japan

[21] Appl. No.: 764,735

[22] Filed: Sep. 24, 1991

[30] Foreign Application Priority Data

Sep. 25, 1990 [JP] Japan .................. 2-251794

[51] Int. Cl.$^5$ .............................................. G06F 15/00
[52] U.S. Cl. ........................................ 395/22; 395/11; 395/905; 364/424.01; 364/424.05; 364/424.1
[58] Field of Search ...................... 395/11, 21, 22, 905; 364/424.05, 424.1, 424.01; 74/866

[56] References Cited

U.S. PATENT DOCUMENTS

| | | | |
|---|---|---|---|
| 4,951,208 | 8/1990 | Etoh | 364/426.01 |
| 5,041,976 | 8/1991 | Marko et al. | 364/424.03 |
| 5,099,428 | 3/1992 | Takahashi | 395/905 |
| 5,155,801 | 10/1992 | Lincoln | 395/22 |
| 5,155,802 | 10/1992 | Mueller et al. | 395/11 |
| 5,162,997 | 11/1992 | Takahashi | 395/905 |

FOREIGN PATENT DOCUMENTS

59-200845 11/1984 Japan.
61-124759 6/1986 Japan.
2-21058 1/1990 Japan.

OTHER PUBLICATIONS

Zang et al, "Distributed Parallel Cooperative Problem-Solving with Voting and Election System of Neural Learning Networks," Parallel Processing in Neural Systems, 1990, pp. 513-516.

Touretzky et al, "What's Hidden in the Hidden Layers," Byte, Aug. 1989, pp. 227-233.

Iwata et al, "A Large Scale Neural Network ComNet and its Application to Chinese Character Recognition," INNC, Jul. 1990, pp. 83-86.

Cortes et al, "A Network System For Image Segmentation," IJCNN, 18-22 Jun. 1989, pp. I-121-I-125.

*Primary Examiner*—Allen R. MacDonald
*Attorney, Agent, or Firm*—Lowe, Price, LeBlanc & Becker

[57] ABSTRACT

An apparatus for recognizing driving environments of a vehicle including a plurality of sensors for detecting various parameters relating to driving conditions of the vehicle such as throttle valve open angle, vehicle running speed, brake pedal depression amount and gear shift range of an automatic transmission, first and second neuron interfaces for converting parameter values detected by the sensors into a plurality of input patterns having predetermined configuration, first and second neural networks having input layers to which corresponding input patterns are applied, hidden layers and output layers for producing recognition results, and a multiplexer for selecting one of the recognition results produced on the output layers of the first and second neural networks. The first neural network has a superior separating or recognizing and learning faculty, while the second neural network has a superior associating faculty. A accelerating pedal depression amount is detected by a sensor and a variation of the thus detected amount is compared with a reference value. When the variation is larger than the reference value, the recognition result produced by the first neural network is selected and when the variation is smaller than the reference value, the recognition result from the second neural network is selected.

7 Claims, 4 Drawing Sheets

FIG_2A
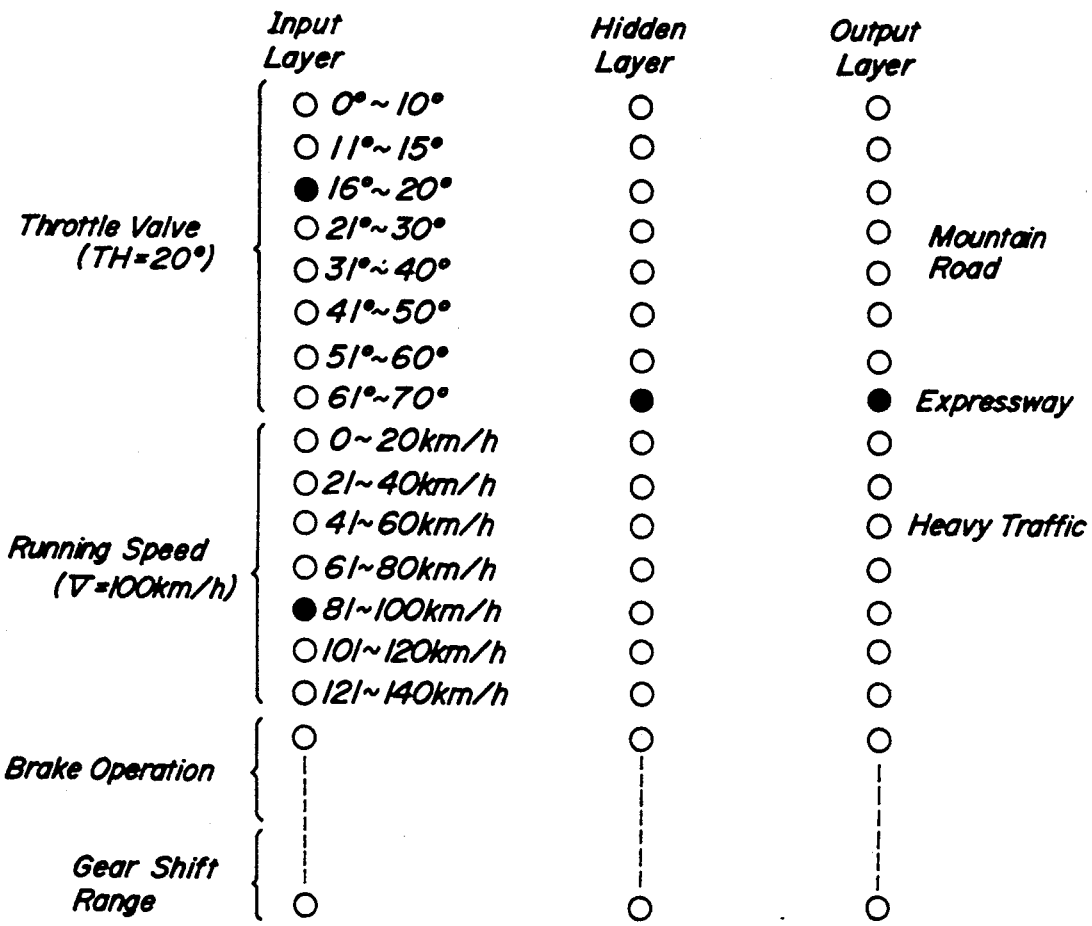
FIG_2B
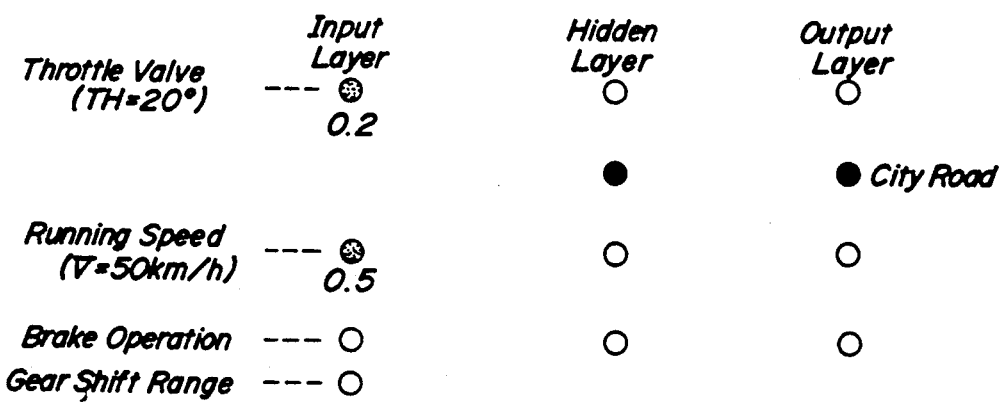

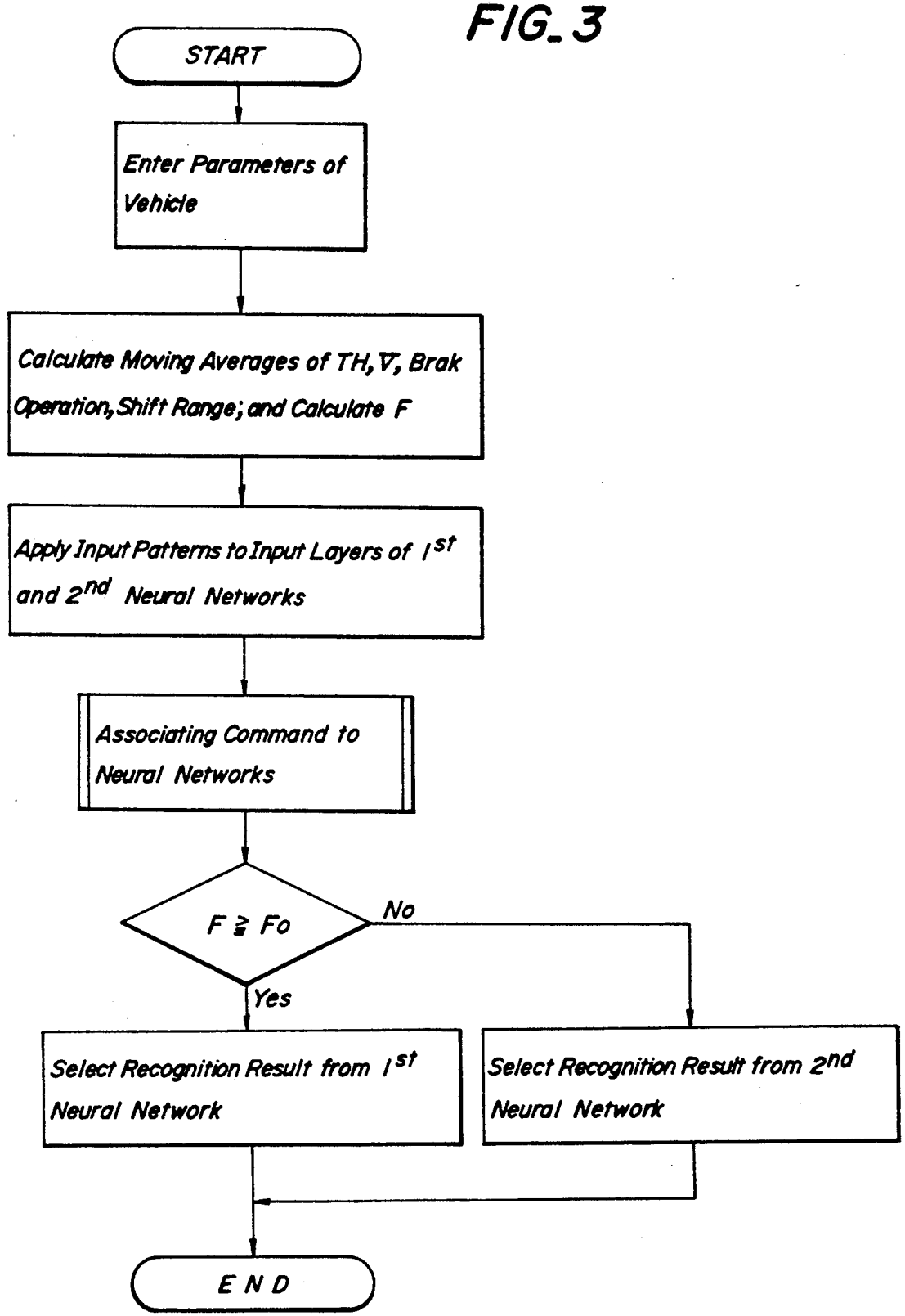

FIG_4A
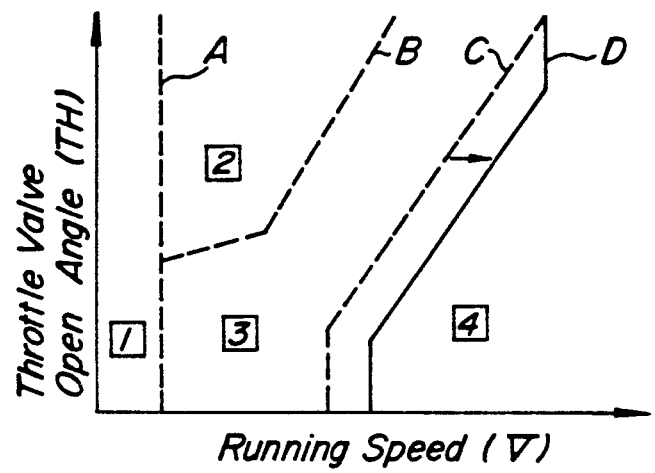
FIG_4B
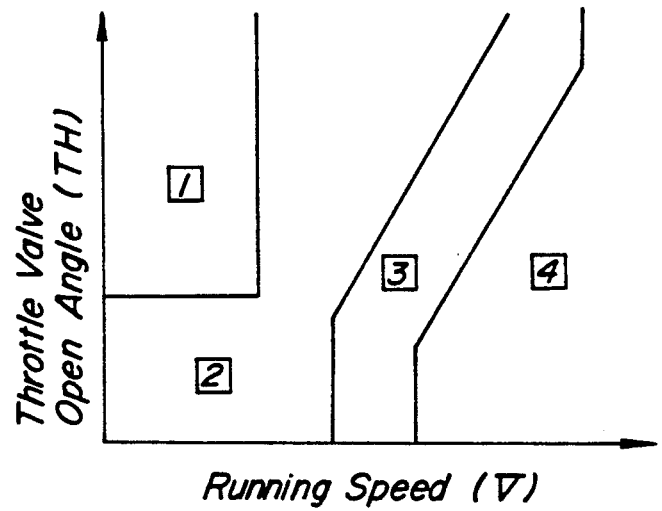

APPARATUS FOR RECOGNIZING DRIVING ENVIRONMENT OF VEHICLE

BACKGROUND OF THE INVENTION

Field of the Invention and Description of the Related Art

The present invention relates to an apparatus for recognizing various driving environments of a vehicle such as road conditions and traffic conditions.

Such an apparatus for recognizing the driving environments of a vehicle can be advantageously used to recognize various running conditions such as kinds of roads, e.g. freeways, expressways, roads in mountains and roads in cities, configurations of roads, e.g. zig-zag roads and straight roads, and traffic conditions, while operating conditions of drivers, e.g. operating speeds and characteristics of specific drivers and habits of a passenger or passengers are taken into account, and an automotive vehicle can be effectively controlled in accordance with the thus detected driving environments.

Heretofore, there have been proposed various apparatuses for recognizing driving environments of an automotive vehicle. For instance, in Japanese Patent Laid-open Publications Kokai Sho Nos. 59-200845 and 61-124759, there is disclosed an apparatus for recognizing the driving environments such as the inclination of roads and traffic conditions, in which characteristics of variations of physical amounts of vehicle parameters relating to the above mentioned driving environments are written in a program as a logic and the slope or inclination angle of roads and traffic conditions are detected by checking what a condition on the program is satisfied by the detected vehicle parameters.

In Japanese Patent Laid-Open Publication Kokai Hei No. 2-21058, there is further described another known apparatus for recognizing the driving environments of the automotive vehicle, in which the driving environments are recognized by utilizing a neural network having input layer, intermediate hidden layer and output layer. In this known apparatus, it is necessary to learn or write relations or combinations of various parameter input patterns and output patterns prior to the recognizing operation, but it is possible to recognize the driving environments by taking into account of non-specific matters such as habits of the drivers and passengers which could not be written by a usual program routine, so that its application will be extended in the feature.

In the known driving environments recognizing apparatuses, various driving conditions, e.g. various kinds of parameters of the vehicle running conditions are detected and the thus detected parameter values are applied to the input layer of the neural network as an input parameter pattern so as to excite or stimulate desired neurons on the input layer, and then the neural network operates to produce an output pattern on the output layer in accordance with the input parameter pattern by the associative operation. In this known apparatus, the recognition ratio or separation ratio can be made high. However, when a detected input parameter pattern is not identical with any of input parameter patterns which have been written in the neural network during the learning operation, although the detected input parameter pattern is similar to one of the learned input pattern of vehicle parameters, an output pattern which is not associated with said learned pattern of vehicle parameters might be derived. Therefore, when the driving environments are distinctly distinguished from each other such as the freeway running and the general way running, any problem occurs. However, when the driving environments are not clearly distinguished from each other, the recognition could not be performed correctly. For instance, the heavy traffic condition and light traffic condition have no definite boundary, the recognition result could not be obtained always correctly. In this manner, in the known driving environment recognizing apparatuses a versatility of a so-called self-organization is very low.

SUMMARY OF THE INVENTION

The present invention has for its object to provide a novel and useful apparatus for recognizing driving environments of a vehicle, in which various driving environments can be recognized in a precise and correct manner by selectively using the most suitable neural networks in accordance with running conditions including operating conditions of a driver.

The present invention is based on the recognition that when distinctly distinguishable driving environments are to be recognized, it is advantageous to use a neural network having superior separating or recognizing function and learning function, but when driving environments which could not be distinguished clearly, it is suitable to use a neural network having a superior associating faculty.

According to the invention, an apparatus for recognizing driving environments of a vehicle comprises:

detecting means including a plurality of sensors for detecting parameters which are related to the driving environments of the vehicle to be recognized to produce a set of detected parameter values;

converting means including a plurality of neuron interfaces, each of which receives said set of detected parameter values and produces a input pattern of detected parameters;

recognizing means including a plurality of neural networks having different properties, each of said neural networks comprises an input layer for receiving an input pattern of detected parameters produced by a corresponding neuron interface, an output layer for producing a recognition result, and a hidden layer for coupling said input and output layers with each other; and selecting means for selecting one of recognition results produced by said plurality of neural networks in accordance with driving conditions.

In the driving environment recognizing apparatus according to the invention, one of a plurality of neural networks having different properties is selected in accordance with the driving conditions of the vehicle and a recognition result produced by the selected neural network is derived as a final recognition result. Therefore, the precision of the recognition can be improved and the versatility of the self-organization can be attained.

BRIEF DESCRIPTION OF THE DRAWINGS

FIGS. 2A and 2B are schematic views illustrating the construction of two neural networks having different properties shown in FIG. 1;

FIG. 3 is a flow chart representing the operation of the neural network in the term of a running condition recognizing program; and FIGS. 4A and 4B are schematic views depicting various gear shift patterns for an automatic transmission selected by the recognition result.

DESCRIPTION OF THE PREFERRED EMBODIMENTS

Figure 1:
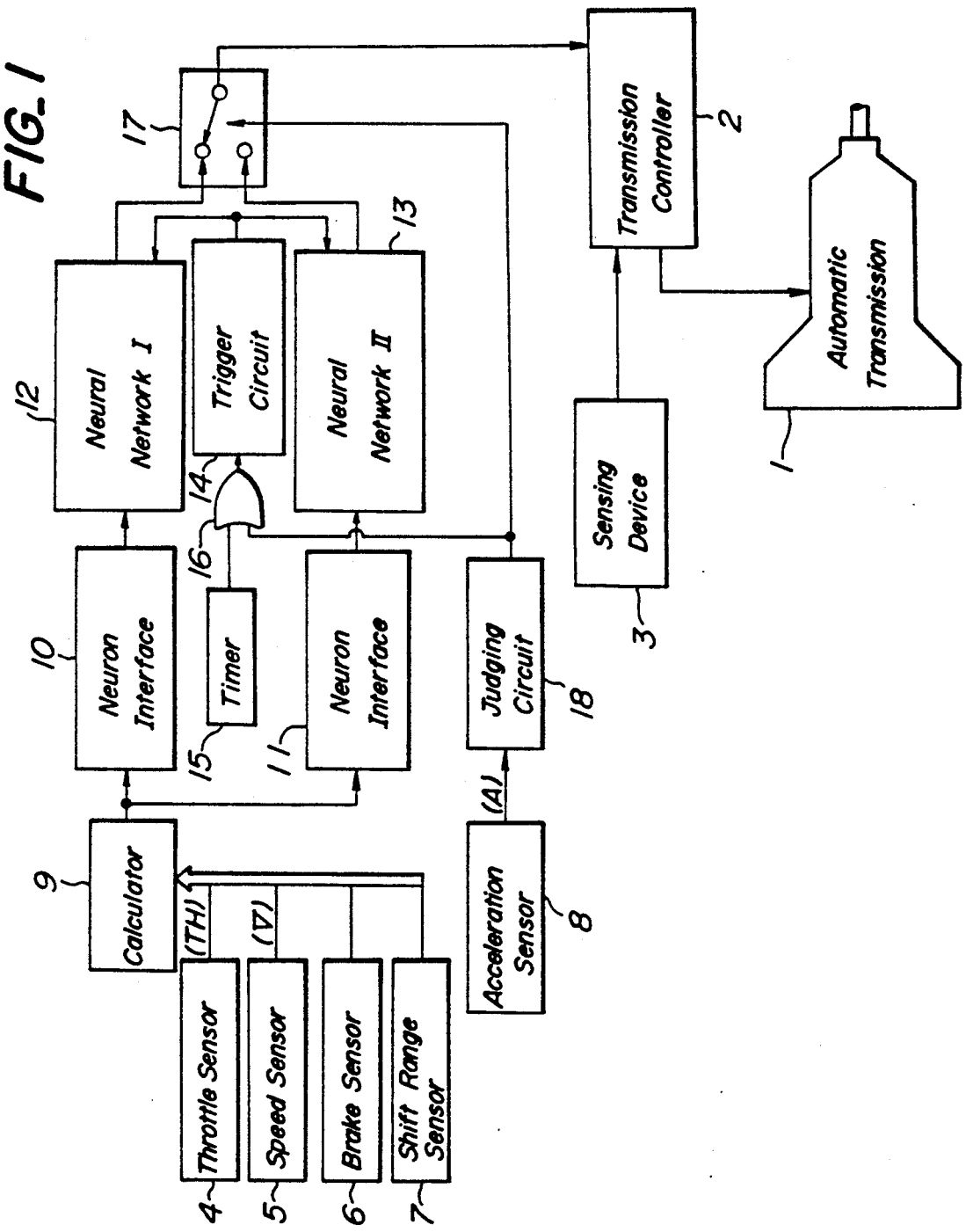
FIG. 1 block diagram showing an embodiment of the driving environment recognizing apparatus according to the invention.

FIG. 1 is a block diagram showing an embodiment of the apparatus for recognizing driving environments of a vehicle according to the invention. In the present embodiment, the recognition result derived from the apparatus is utilized to control a gear shift pattern of an automatic transmission. An automatic transmission 1 is controlled by an automatic transmission controller 2 such that one of a plurality of gear shift patterns is selected in accordance with the recognition result. When the driving environment recognizing apparatus recognizes that the automotive vehicle is running on a general road in a light traffic, the controller 2 selects a gear shift pattern shown by broken lines A, B and C in FIG. 4A, and when it is recognized that the automotive vehicle runs on an expressway, the controller 2 selects a gear shift pattern indicated by the broken lines A and B and a solid line D in FIG. 4A, in which a gear shift timing from the third to fourth gear range is shifted toward a high speed side. Further, when the driving environment recognizing apparatus recognizes that the vehicle is running on a city road, the controller 2 selects a gear shift pattern depicted in FIG. 4B which is totally shifted toward a lower speed side upon comparison with the gear shift pattern for the general road. That is to say, the controller 2 determines a suitable gear shift range in accordance with vehicle running speed V and throttle valve open angle TH detected by a sensing device 3 on the basis of the desired gear shift pattern selected by the recognition result.

Now the driving environment recognizing apparatus according to the invention will be explained. There are provided various sensors 4 to 8 for detecting various parameters relating to the driving environments. That is to say, the sensor 4 detects the throttle valve open angle TH, the sensor 5 the vehicle running speed V, the sensor 6 the operation of the brake pedal, the sensor 7 the gear shift range of the automatic transmission and the sensor 8 detects an amount of the accelerating pedal depression A. Output signals of the sensors 4 to 7 are supplied to a calculator 9 which functions to calculate moving averages of above mentioned parameters for a given time period. It should be noted that the sensor 6 detects a depression amount of the brake pedal at a regular time interval, and then the calculator 9 calculates a summation of depression amounts over successive m (e.g. m=200) samples. The sensor 7 detects the gear shift position and generates an output representing a numerical value such as 1, 2, 3, 4 or 5. For this output of the sensor 7, the calculator 9 does not calculate its moving average. According to the invention, it is also possible to construct the calculator 9 to calculate dispersion, spectrum or unbiased dispersion instead of a moving average of a detected parameter value. The thus calculated moving averages of the throttle valve open angle TH, vehicle running speed V and the brake pedal depression amount and the numerical output of the gear shift range sensor 7 are then parallelly supplied to neuron interfaces 10 and 11 which operate to convert the moving averages and numerical output into electrical amounts which can excite or stimulate neurons in an input layer of a neural network. That is to say, each of the calculated moving averages of the parameters is normalized into a value between 0 and 1. For instance, a moving average of the throttle valve open angle TH is 20° is converted to a value of 0.2, and a moving average of the vehicle running speed V of 50 Km/h is converted to a value of 0.5. The numerical output of the sensor 7 is also converted into a value between 0 and 1. The neuron interfaces 10 and 11 function to form a set of thus normalized or converted values as an input pattern.

According to the invention, there are arranged a plurality of neural networks having different properties. In the present embodiment, there are provided first and second neural networks 12 and 13. The first neural network 12 has a superior recognizing or separating faculty as well as a superior learning faculty. As illustrated in FIG. 2A the first neural network 12 has the input layer composed of a large number of neurons each corresponding to fine ranges of the parameters. For instance, for the vehicle running speed V, there are provided seven neurons corresponding to speed ranges of 0–20 Km/h, 21–40 Km/h, 41–60 Km/h, 61–80 Km/h, 81–100 Km/h, 101–120 Km/h and 121–140 Km/h. Therefore, the first neuron interface 10 is constructed such that it produces an input pattern of the detected parameters which corresponds to the composition of the input layer of the first neural network 12. For instance, when the moving average of the throttle valve opening angle is 20° and the moving average of the vehicle running speed V is 100 Km/h, the input pattern of the detected parameters is formed such that corresponding neurons in the input layer of the first neural network 12 are excited or stimulated to a higher degree. That is to say, a neuron in the input layer corresponding to the throttle valve open angle of 16°–20° and a neuron corresponding to the vehicle speed range of 81–100 Km/h are excited by a normalized value of 0.9 and the remaining neurons in the input layer are all excited by a normalized value of 0.1 as illustrated in FIG. 2A.

The second neural network 13 is formed by a neural network having a superior associating faculty and the input layer is composed of a smaller number of neurons. That is to say, the input layer of the second neural network 13 includes one neuron for each of the parameters. The second neuron interface 11 is constructed to form an input pattern of the detected parameters which corresponds to the input layer of the second neural network 13. For instance, the moving average of the detected throttle valve open angle TH is 20° and the moving average of the sensed vehicle running speed V is 50 Km/h, the second neuron interface 11 converts these parameter values into normalized values between 0 and 1 and the neuron for the throttle valve open angle is excited by the application of 0.2 which corresponds to a normalized value of the angle of 20°, and at the same time a neuron for the vehicle running speed is excited by the application of 0.5 corresponding to the normalized value of 50 Km/h.

There is further provided a trigger circuit 14 for initiating the operation of the neural networks 12 and 13. The trigger circuit 14 generates two kinds of commands, one for initiating the learning of the neural networks and the other for starting the associative operation of the neural networks. The former command is called a writing command and the latter command an associative command. When the trigger means 14 produces the writing command, the first and second neural networks 12 and 13 are operated to store mutual relations between the input patters of parameters and the output patterns. This can be performed by utilizing a well-known back-propagation technique. During this learning operation, it is possible to take into account of specific characteristics, habits and preferences of drivers and passengers.

The trigger circuit 14 also produces the associating command. When this associating command is supplied to the first and second neural networks 12 and 13, the first and second neural networks 12 and 13 initiate the associating operation on the basis of the input patterns of the detected parameters formed by the first and second neuron interfaces 10 and 11, respectively and generate recognition results. When the input pattern illustrated in FIG. 2A is applied to the first neural network 12, it produces on its output layer a recognition result which represents driving on "expressway". When the input pattern of the detected parameters shown in FIG. 2B is applied to the second neural network 13, it generates a recognition result which indicates driving on "city road". In this manner, in the example illustrated in FIGS. 2A and 2B, the first neural network 12 recognizes driving on "expressway" and the second neural network 13 detects driving on "city road".

The trigger circuit 14 sends the writing or learning command when the driving environment recognizing apparatus according to the invention is installed on an automotive vehicle and when a user sets the apparatus in accordance with one's specific characteristics and preferences. After that, the trigger circuit 14 produces the associating command. To this end, there are provided a timer 15 and an OR gate 16. The timer 15 includes a clock pulse generator and a counter for counting clock pulses. Each time the counter has counted the given number of clock pulses, it produces an output signal. When the output signal of the timer 15 is supplied to the trigger circuit 14 via the OR gate 16, the trigger circuit produces the associating command. In this manner, the associating commands are repeatedly produced at a regular time interval of, for example one minute.

The recognition result produced by the first and second neural networks 12 and 13 are supplied to a multiplexer 17 serving as the neural network selecting means and a selected recognition result is further supplied to the automatic transmission controller 2. In order to produce a switching signal for the multiplexer 17, the accelerating pedal depression amount A detected by the sensor 8 is supplied to a judging circuit 18, in which a dispersion of the depression amount A for a unit time period is derived. It should be noted according to the invention, it is possible to use a first differential of a rotation angle of a steering wheel, a brake pedal depression force or a skin potential level of a driver instead of the accelerating pedal depression amount A. Moreover, the judging circuit 19 may derive an average spectrum, an unbiased dispersion or a moment value of these values instead of the dispersion. In the judging circuit 19, a ratio F of a dispersion A to at a time t0 to a dispersion A t1 at a time t1(t0>t1) is derived (F=A to /A t1). When F<1, 1/F=F is used. The thus calculated ratio F resembles the unbiased dispersion and becomes larger when a variation of the accelerating pedal depression amount A during a time period from t0 to t1 is large. In the judging circuit 18, the thus derived ratio F is compared with a predetermined reference value F0. When the ratio F is greater than the reference value F0, the judging circuit 18 sends the switching signal to the multiplexer 17 such that the recognization result derived by the first neural network 12 having the superior recognizing and learning faculty is selected, because in such a case it can be assumed that the accelerating pedal is operated abruptly. Contrary to this, when the ratio F is smaller than the reference value F0, the judging circuit 18 sends the switching signal for selecting the recognition result obtained by the second neural network 13 which has the superior associating faculty.

One of the recognition results produced by the first and second neural networks 12 and 13 is selected by the multiplexer 17 in accordance with the switching signal supplied from the judging circuit 18 and then the thus selected recognition result is supplied to the automatic transmission controller 2. At the same time, the switching signal produced by the judging circuit 18 is also supplied to the trigger circuit 14 via the OR gate 16, so that each time the switching signal is supplied from the judging circuit 18 to the multiplexer 17, the associating operation in the neural networks 12 and 13 is predominantly initiated in regardless of the output signal from the timer 15.

FIG. 3 is a flow chart representing the associating operation.

At first, the parameters representing the running conditions of the vehicle detected by the sensors 4 to 8 are entered. Then, the moving averages of the throttle valve open angle TH, vehicle running speed V, brake pedal depression amount and gear shift range detected by the sensors 4 to 7 are calculated. Further, the ratio F of the accelerating pedal depression amount A detected by the sensor 8 is calculated. After that, the first and second neuron interfaces 10 and 11 produce the input patterns of the detected parameters, and these input patterns are applied to the input layers of the first and second neural networks 12 and 13, respectively. When the association command is supplied from the trigger circuit 14 to the first and second neural networks 12 and 13, corresponding neurons in the input layers of these neural networks are excited and the recognition results are produced on the output layers. Next, the ratio F is compared with the reference value F0. When the ratio F is larger than the reference value F0, the recognition result produced by the first neural network 12 is supplied to the automatic transmission controller 2, but when the ratio F is smaller than the reference value F0, the recognition result produced by the second neural network 13 is supplied to the automatic transmission controller 2.

When the recognition result denotes the driving on general road, the controller 2 controls the gear shift timing in the automatic transmission 1 in accordance with the gear shift pattern illustrated by the broken lines A, B and C in FIG. 2A, and when the recognition result shows the driving on the expressway, the controller 2 controls the automatic transmission 1 in accordance with the gear shift pattern represented by the lines A, B and D in FIG. 2A. When the recognition result indicates the driving on city road, the controller 2 controls the automatic transmission 1 in accordance with the gear shift pattern depicted in FIG. 2B. Therefore, when the driver depresses the accelerating pedal to pass an automotive vehicle or vehicles on the expressway, the down shift gear change is achieved promptly to improve the acceleration property. In the driving on city road, the gear shift pattern shifted toward the lower speed side is selected, so that the number of gear shifts is decreased and the smooth running with a smaller number of gear shift shocks can be achieved.

According to the invention, when a variation of the dispersion of the accelerating pedal depression amount A is large, i.e. the accelerating pedal is depressed abruptly by a large amount, the first neural network 12 having the superior recognizing and learning faculty is selected and the automatic transmission 1 is controlled in accordance with the recognition result derived from the first neural network, and when a variation of the dispersion of the accelerating pedal depression amount A is small, the recognition result produced by the second neural network 13 which has the superior associating faculty is selected to control the automatic transmission. Therefore, even in the latter case, it is possible to perform the recognition of the driving environment precisely, and thus the versatility of the self-organization of the learning can be realized.

The present invention is not limited to the embodiment explained above, but many alternations and modifications can be conceived by those skilled in the art within the scope of the invention. For instance, in the above embodiment, there are provided two neural networks, but according to the invention, it is also possible to arrange more than two neural networks having different properties. Furthermore, in the above embodiment, the gear shift patterns of the automatic transmission are selected in accordance with the recognition results, but in addition to or instead of the selection of the gear shift patterns, various other factors may be controlled in accordance with the recognition results. For instance, an amount of fuel supply in the fuel injection type engine, a feedback amount in EGR (exhaust gas recirculation) system, a steering force in the power steering system, damping characteristics in the electrically controlled suspension, the two-four wheel driving system, and the four-wheel steering system may be controlled in accordance with the recognition results. Moreover, in the above embodiment, the selection of the recognition results is effected in accordance with the dispersion of the accelerating pedal depression amount, but according to the invention, the selection may be performed by utilizing any other parameter of parameters which indicate the running condition of the vehicle.

As explained above, according to the invention, there are provided a plurality of neural networks having different faculties and any one of them is selected in accordance with the detected running conditions of the vehicle, so that the recognizing precision can be improved under a small variation in the running conditions, while the recognizing and learning faculty under a large variation of the running conditions is maintained high, so that the versatility of the self-organization of the learning can be achieved. Moreover, the recognizing precision becomes high, and thus the relations between the input and output patterns can be learned effectively and the writing operation can be performed efficiently within a short time.

What is claimed is:

1. An apparatus for recognizing driving environments of a vehicle comprising:

detecting means including a plurality of sensors for detecting parameters which represent operating conditions of the vehicle to produce a set of detected parameter values;

converting means including a plurality of neuron interfaces, each of which receives said set of detected parameter values and produces an input pattern of detected parameters;

recognizing means including a plurality of neural networks having different recognizing and learning faculties and different associating faculties, each of said neural networks comprising an input layer for receiving an input pattern of detected parameters produced by a corresponding neuron interface, an output layer for producing a recognition result, and a hidden layer for coupling said input and output layers with each other; and selecting means including sensing means for detecting driving conditions of the vehicle directly indicative of vehicle control apparatus positional information within the vehicle to produce a driving condition signal, a signal processing means for processing said driving condition signal to produce a switching signal, and switching means for selecting one of recognition results produced by said plurality of neural networks in accordance with said switching signal.

2. An apparatus according to claim 1, wherein said recognizing means comprises first and second neural networks a recognizing and learning faculty of said first neural network being higher than that of said second neural network, but no associating faculty of said first neural network being lower than that of said second neural network; and said signal processing means of the selecting means produces a first switching signal for selecting a recognition result produced by said first neural network when said driving condition signal fluctuates largely and produces a second switching signal for selecting a recognition result produced by said second neural network when said driving condition signal fluctuates slightly.

3. An apparatus according to claim 2, wherein said sensing means of the selecting means comprises a sensor for detecting an accelerating pedal depression amount, said signal processing means includes a judging circuit for calculating a variation of the accelerating pedal depression amount and for comparing the thus calculated variation with a predetermined reference value to produce said switching signal, and said switching means comprises a multiplexer for responding to said switching signal such that when said variation is larger than said reference value, the recognition result produced by said first neural network is selected and when said variation is smaller than said reference value, the recognition result produced by said second neural network is selected.

4. An apparatus according to claim 3, wherein said signal processing means of said selecting means produces said variation of the accelerating pedal depression amount by calculating one of dispersion, average spectrum and unbiased dispersion of the detected accelerating pedal depression amount.

5. An apparatus according to claim 4, wherein said detecting means comprises a first sensor for detecting a throttle valve open angle, a second sensor for detecting a vehicle running speed, a third sensor for detecting a brake pedal depression amount and a fourth sensor for detecting a gear shift range of an automatic transmission.

6. An apparatus according to claim 5, further comprising a control circuit for generating an associating command at a constant time interval, in response to which said neural networks initiate the associating operation.

7. An apparatus according to claim 6, wherein said control circuit produces an associating command in response to said switching signal supplied by said judging circuit.

* * * * *